(12) United States Patent
Sattler et al.

(10) Patent No.: US 11,194,441 B2
(45) Date of Patent: Dec. 7, 2021

(54) PROCESS MAP NAVIGATION TOOL

(71) Applicant: SAP SE, Walldorf (DE)

(72) Inventors: Juergen Sattler, Wiesloch (DE); Marcel Kassner, Hockenheim (DE); Otfried von Geisau, Sinsheim-Eschelbach (DE); Brit Panzer, Mannheim (DE); Thomas Salvador, Oestringen (DE); Bettina Laugwitz, Ludwigshafen (DE); Benjamin Braun, Ludwigshafen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/848,737

(22) Filed: Apr. 14, 2020

(65) Prior Publication Data

US 2021/0318791 A1 Oct. 14, 2021

(51) Int. Cl.
*G06F 3/048* (2013.01)
*G06F 3/0481* (2013.01)
*G06F 9/451* (2018.01)
*G06F 3/0482* (2013.01)

(52) U.S. Cl.
CPC ........ *G06F 3/04817* (2013.01); *G06F 3/0482* (2013.01); *G06F 9/451* (2018.02)

(58) Field of Classification Search
CPC .............. G06F 16/9024; G06F 11/323; G06F 11/3006; G06F 8/70; G06Q 10/06; G06Q 30/0201; G06Q 50/01
See application file for complete search history.

(56) References Cited

U.S. PATENT DOCUMENTS

| | | | | |
|---|---|---|---|---|
| 9,070,097 B2* | 6/2015 | Mayerle | ................. | G06Q 10/06 |
| 9,286,584 B2 | 3/2016 | Mayerle et al. | | |
| 2005/0204029 A1* | 9/2005 | Connolly | .............. | G06F 9/4843 |
| | | | | 709/223 |
| 2007/0245300 A1* | 10/2007 | Chan | ...................... | G06Q 10/06 |
| | | | | 717/105 |
| 2011/0179371 A1* | 7/2011 | Kopycinski | ............ | G06Q 10/10 |
| | | | | 715/772 |
| 2013/0159007 A1* | 6/2013 | Brosche | ................. | G06Q 10/06 |
| | | | | 705/1.1 |
| 2014/0364969 A1* | 12/2014 | Timsjo | ................... | G05B 15/02 |
| | | | | 700/83 |
| 2014/0368866 A1* | 12/2014 | Kikumoto | ............. | G06F 3/1259 |
| | | | | 358/1.15 |

(Continued)

OTHER PUBLICATIONS

García et al,; How to Describe Workflow Information Systems to Support Business Process; © 2008 IEEE; 8 pages.*

(Continued)

*Primary Examiner* — Linh K Pham
(74) *Attorney, Agent, or Firm* — Klarquist Sparkman, LLP

(57) ABSTRACT

Systems, methods, and computer media for implementing a process map navigation tool are provided herein. A process map provides a graphical user interface that represents a process. Icons represent process components or steps and are related using flow connectors to indicate an ordered relationship between the process components. Users can click on an icon and either initiate the corresponding process component or launch a menu of tasks relevant to the step. The icons can also include indicators to provide workflow information.

16 Claims, 8 Drawing Sheets

(56) References Cited

U.S. PATENT DOCUMENTS

| | | | | |
|---|---|---|---|---|
| 2015/0012330 A1* | 1/2015 | Sugiura | ............... | G06Q 10/0633 |
| | | | | 705/7.26 |
| 2016/0217399 A1* | 7/2016 | Roelofs | ............ | G06Q 10/08355 |
| 2017/0070624 A1* | 3/2017 | Hanada | ............... | H04N 1/00506 |
| 2017/0124531 A1* | 5/2017 | McCormack | ........ | G06F 3/04845 |
| 2018/0068277 A1* | 3/2018 | Okuda | ................... | G06Q 40/08 |
| 2020/0342395 A1* | 10/2020 | Rajkhowa | ........... | G06Q 10/0833 |
| 2020/0380449 A1* | 12/2020 | Choi | ......................... | G06N 5/04 |
| 2021/0019097 A1* | 1/2021 | Sawata | ................. | G06F 3/1262 |

OTHER PUBLICATIONS

Zhang et al., Reengineering User Interfaces of E-Commerce Applications Using Business Processes; © 2006, IEEE, 10 pages.*
SAP, "Process Flow Widget," downloaded from https://help.boyum-it.com/B1UP/index.html?process-flow-widget.html, 4 pp. (downloaded on Feb. 13, 2020).
SAP AG, "Procure-to-Pay (Non-Stock) Scenario Overview," PowerPoint presentation, downloaded from https://help.sap.com/viewer/2754875d2d2a403f95e58a41a9c7d6de/1811/en-US/2bb77642722d10149f6796a86c3666f1.html, 19 pp. (2013).

* cited by examiner

PROCESS MAP NAVIGATION TOOL

BACKGROUND

Software is widely used by individuals, companies, and other organizations to manage and implement processes, from logistics and personnel management to product management and operation of complex machinery and industrial processes. As software applications continue to incorporate new features and increase in processing power and speed, user interfaces for managing processes have become difficult to use and understand.

DETAILED DESCRIPTION

The examples described herein allow for navigation and implementation of a process through a process map in a graphical user interface (GUI). Software applications for managing and implementing processes have become increasingly complicated, and using such applications has become correspondingly difficult. Options and tasks are frequently buried in navigation menus, and it can be unclear how the various pieces of a process relate or even where a particular stage fits in the overall process. The process map navigation tools described herein allow a user to visualize the flow and order of an overall process while also providing important workflow information and allowing the user to access or initiate different portions of a process from the process map itself.

As an example, components of a process (e.g., steps or stages) can be represented using icons in a GUI. The icons can be connected (e.g., using arrows or lines) to indicate the flow or order in which the steps or stages are carried out. A user can click on an icon and either initiate the corresponding process step or launch a menu of tasks relevant to the step. The icons can also include indicators to provide workflow information. For example, a counter can be presented with an icon to indicate a number of items awaiting attention, a number of items in the overall workflow, etc. Indicators can also alert the user to bottlenecks in the process (e.g., purchase orders awaiting approval before they can be submitted). The icons, flow connections, and indicators form a process map.

In some examples, the process map reflects only workflow items and/or process stages relevant to the user. In other examples, the process map reflects workflow items and/or process stages relevant to a group of users (e.g., members of an organization, company, team, or department). Some of the icons can correspond to process steps to which the user (or group) does not have access. The inaccessibility can be conveyed by graying out the icon, showing a lock icon, highlighting, fading, or other technique.

The described process map approach to navigating and implementing processes allows users to more efficiently implement processes by conveying context and workflow information and providing efficient access to the various portions of a process. The process map also allows for computing performance improvements by identifying bottlenecks and monitoring workflow, which allows for more accurate provisioning of computing resources. Examples are described below with reference to FIGS. 1-8.

Figure 1:
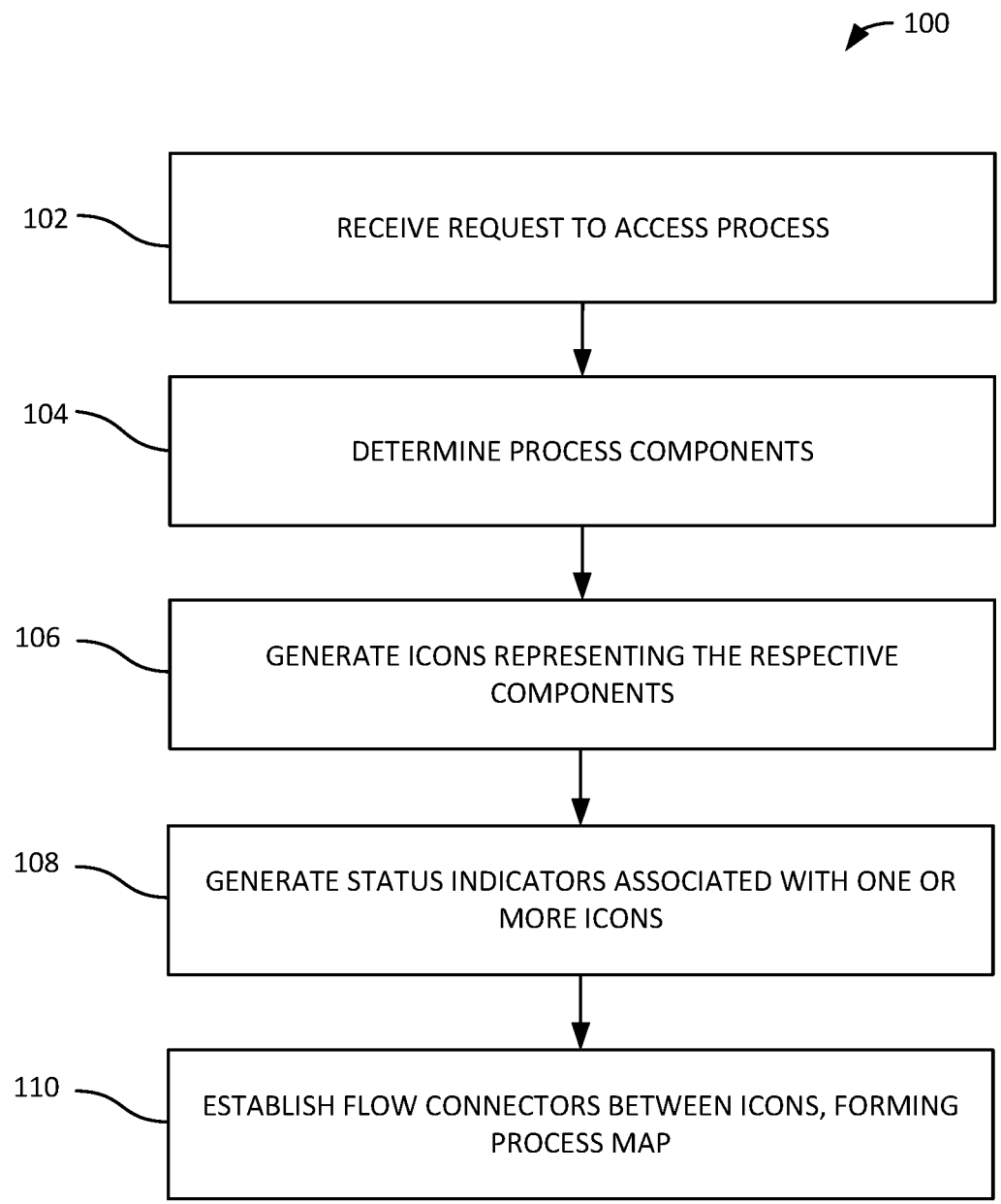
FIG. 1 illustrates an example method of navigating a process in a graphical user interface.
Figure 5:
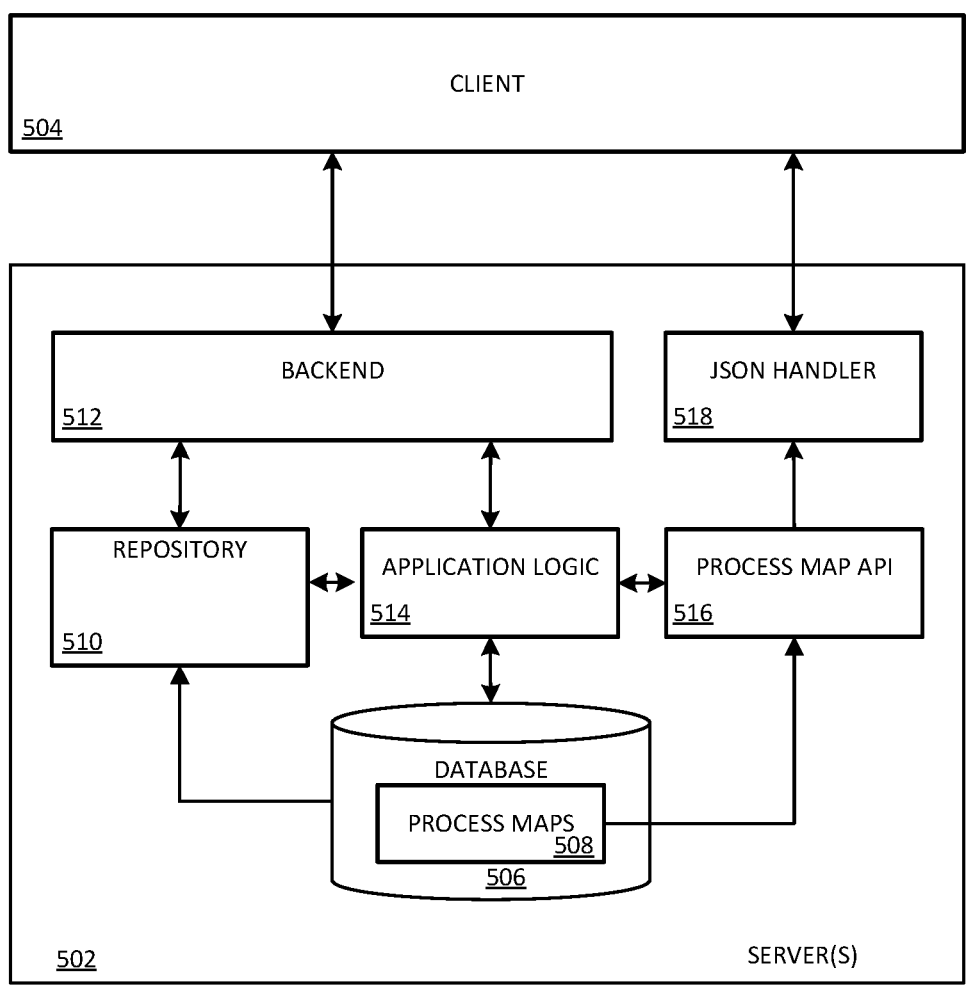
FIG. 5 illustrates an example system configured to generate a process map for a graphical user interface.

FIG. 1 illustrates a method 100 of navigating a process in a graphical user interface. In process block 102, a request to access the process is received in a software application. The request can be submitted automatically when the application is launched, or the request can be initiated by a user through the GUI. The application can be provided as a web application in which information is provided from a remote server to a local client device (e.g., as shown in FIG. 5), or the application can be run locally on a client device. In process block 104, a plurality of process components are determined. Process components can be general stages of a process where one or more of the stages have multiple tasks or steps. Process components can also be individual steps in the process. As used herein, "steps" is used to refer to a portion of a process but does not necessarily imply an order or prerequisite relationship.

Figure 3:
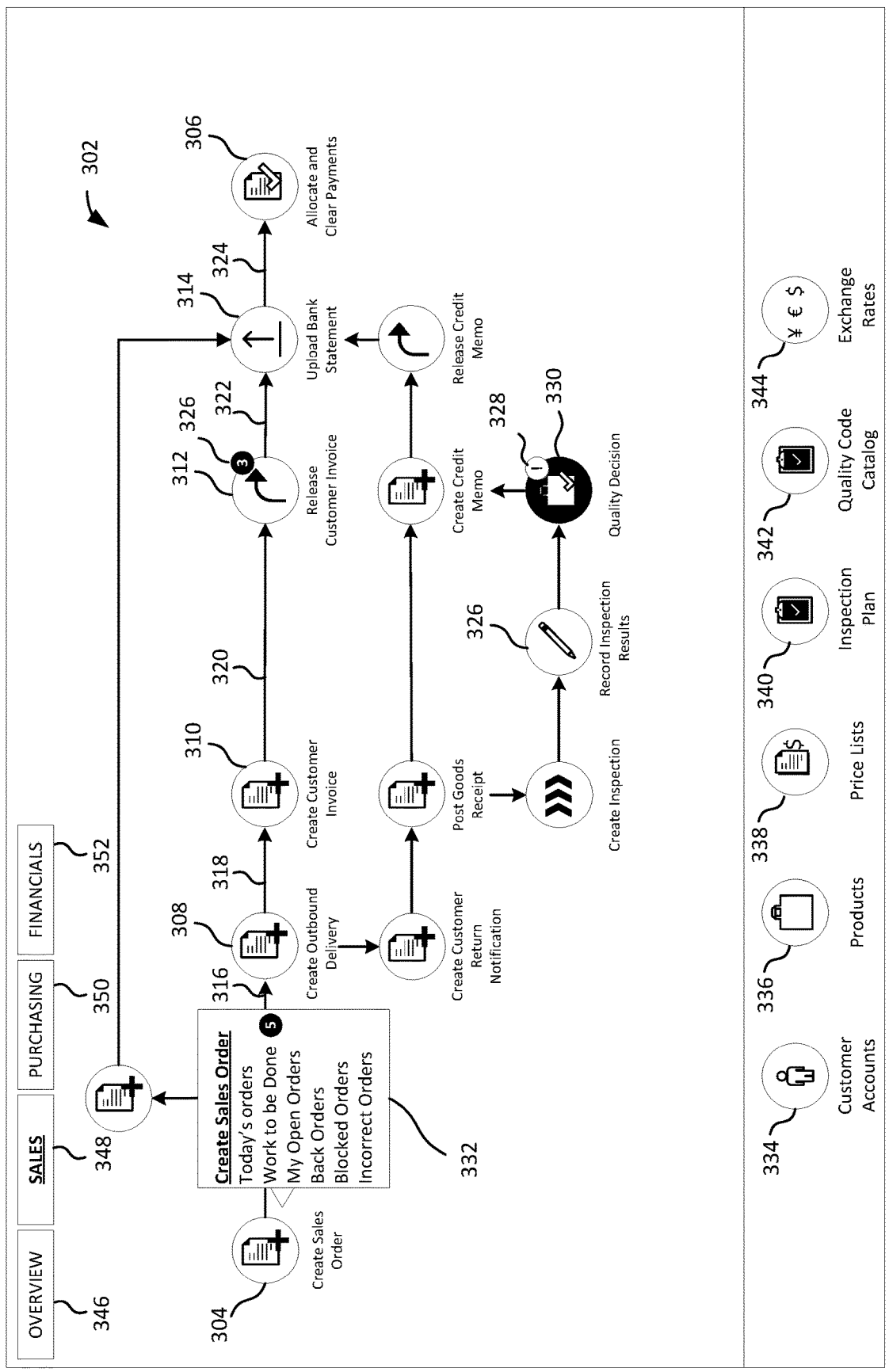
FIG. 3 illustrates an example graphical user interface showing a sales order process map and related items.

In process block 106, icons representing the respective components of the process are generated. For the respective icons, initiation of a task associated with the corresponding component of the process is performed through user interaction with the icon. For example, clicking on a "create sales order" icon can initiate the process of creating a sales order. In some examples, interaction with an icon launches a menu of tasks or other items related to the corresponding process component. Continuing with the sales order example, a menu can be launched with options such as "create sales order," "work to be done," "my open orders," "back orders," "blocked orders," and "incorrect orders." Such an example is illustrated in FIG. 3. In some examples, the icons contain a graphic, text, or other indicator that represents the corresponding process component. This is also illustrated in FIG. 3.

Returning to FIG. 1, in process block 108, status indicators associated with one or more of the icons are generated. The status indicators can represent various things, including: a number of active instances of the corresponding process component, a number of instances of the corresponding process component awaiting action, or a degree of criticality of the process component. The degree of criticality can reflect a need for review/attention, or an overall importance of the component in the process. In some examples, a numeric counter is used in the status indicator. Indicators are discussed in more detail with reference to FIGS. 2 and 3.

In process block 110, flow connectors are established between at least some of the icons, indicating an ordered relationship among the respective process components for the icons. The icons, status indicators, and flow connectors form a process map for the process in the graphical user interface. The flow connectors can be, for example, lines, arrows, or other symbols that indicate a relationship between icons.

In some examples, the process map corresponds to a current user, and the status indicators reflect the current user's workflow. In other examples, the process map corresponds to a group (e.g., a department, team, company, organization, etc.), and the status indicators reflect the workflow of all of the members of the group. For example, a counter associated with a particular icon can indicate how many instances of the corresponding process step are open for the group.

Figure 2:
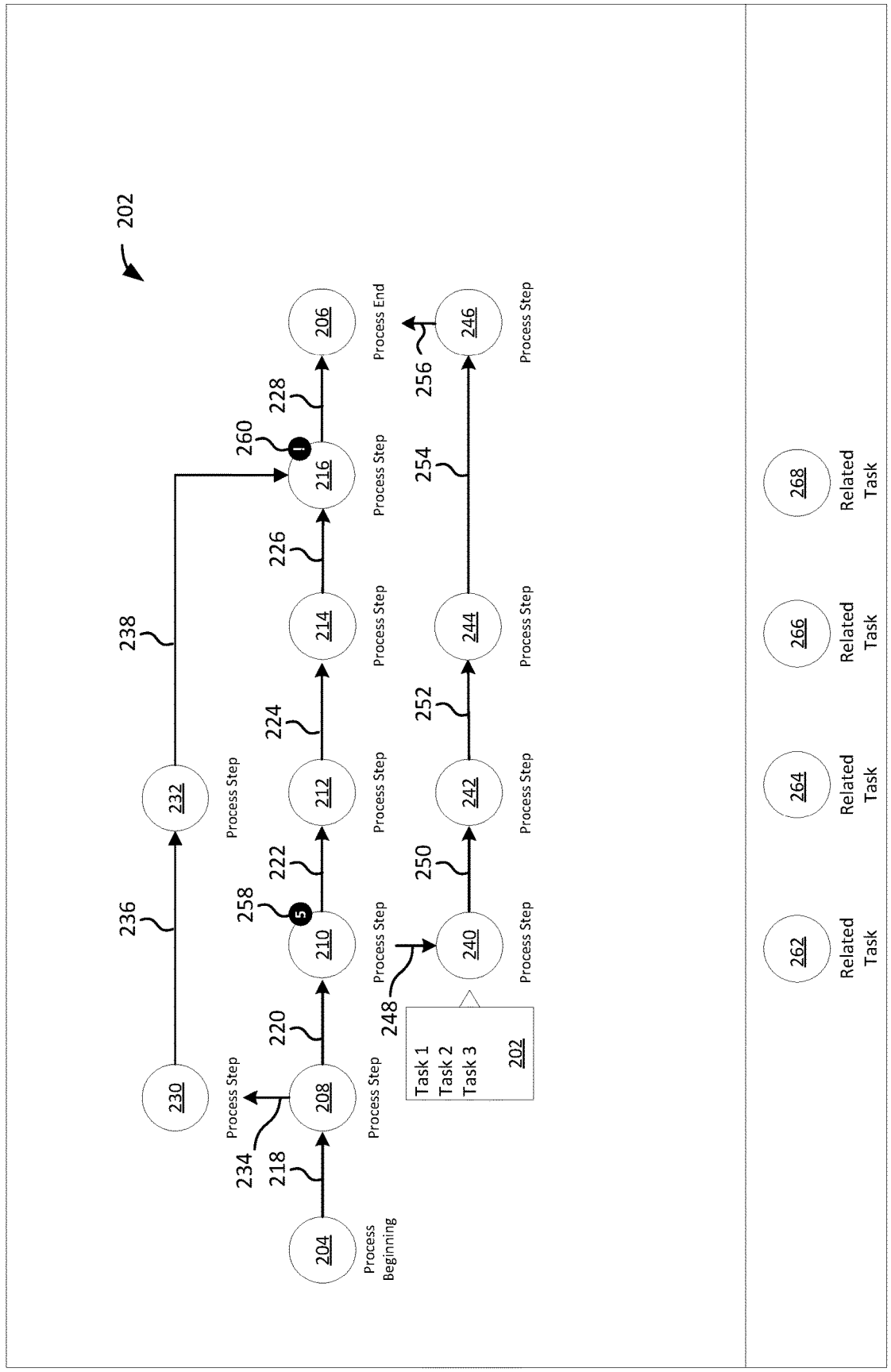
FIG. 2 illustrates an example graphical user interface showing a process map.

FIG. 2 illustrates an example GUI 200. GUI includes process map 202. Process map 202 includes an icon 204 corresponding to a process beginning component (or step), and an icon 206 corresponding to a process end component. The actual steps of the process illustrated in process map 202 are omitted in FIG. 2 to focus on the details of the process map itself. Many processes require different or additional steps depending upon various conditions or initial states. The process represented in process map 202 accordingly provides multiple paths from process beginning icon 204 to process end icon 206, representing the different states or conditions that may exist. In one path, the process flows from process beginning icon 204 to icons 208, 210, 212, 214, and 216 to process end icon 206 via flow connectors 218, 220, 222, 224, 226, and 228, respectively. In another path, the process flows from process beginning icon 204 to icons 208, 230, 232, and 216 to process end icon 206 via flow connectors 218, 234, 236, 238, and 228, respectively. In still another path, the process flows from process beginning icon 204 to icons 208, 210, 240, 242, 244, and 246 to process end icon 206 via flow connectors 218, 220, 248, 250, 252, 254, and 256.

Process map 202 also includes indicators 258 and 260. Indicator 258 is associated with icon 210 and includes a counter displaying the number "5." This can indicate, for example, five instances of a task associated with process step represented by icon 210 that are active or that are awaiting action (e.g., review, approval, etc.). In some examples, non-numeric indicators are used. For example, a red circle, triangle, or other shape could indicate attention is needed in the process step, an orange shape can indicate attention may be required soon, and a green shape can indicate no attention is needed. In some examples, indicators are associated with each icon. In other examples, indicators are shown for certain categories of tasks (e.g., review needed) or when a threshold is met (e.g., five orders awaiting approval).

Indicator 260 is associated with icon 216 and displays an exclamation point indicating a warning or alert. Such an indicator can be displayed, when, for example, a bottleneck is detected at a process step corresponding to icon 216 (e.g., inspections, approvals, quality control analyses, etc., need to be performed for the process to complete). Such indicators can be displayed when a bottleneck threshold is reached (e.g., number of instances of a task associated with the process step reaches a certain level) or when process steps identified as critical require attention. Critical process steps can be required process steps for the process to complete, process steps where errors have been identified, or process steps that otherwise require attention for the overall process to function properly.

GUI 200 also includes icons for related tasks 262, 264, 266, and 268. The related tasks are not a part of the process represented by process map 202 but are related to the process. Examples of related tasks are provided with respect to FIG. 3.

FIG. 3 illustrates a GUI 300 that includes a process map 302 for a sales process. In process map 302, the process flows from icon 304 corresponding to a "create sales order" process to icon 306 corresponding to an "allocate and clear payments" process step via "create outbound delivery" icon 308, "create customer invoice" icon 310, "release customer invoice" icon 312, and "upload bank statement" icon 314, as indicated by flow connectors 316, 318, 320, 322, and 324. As in FIG. 2, multiple flow paths are possible between create sales order icon 304 and allocate and clear payments icon 306 (not all of the icons and flow connectors in the other flow paths are numbered in FIG. 3). In FIG. 3, icons have been generated to represent the respective process steps. As shown in FIG. 3, the icons reflect the corresponding process step (e.g., steps that include creating something have a plus sign, a pencil is shown for "record inspection results" process step 326, etc.).

Similar to FIG. 2, indicator 326, associated with "release customer invoice" icon 312, includes a counter displaying the number "3" to indicate that there are three customer invoices waiting to be released. In some examples, process map 302 displays indicators and/or process step icons specific to the current user, and in some examples process map 302 displays indicators and/or process step icons specific to a group of users. Indicator 328, associated with "quality decision" icon 330, shows an exclamation point to indicate attention is desired in making quality decisions. In FIG. 3, indicator 328 and icon 330 are shown in contrasting shades for emphasis.

Drop-down menu 332 was launched through user interaction with icon 304 and displays several selectable tasks, including "create sales order," "today's orders," "work to be done," "my open orders," "back orders," "blocked orders," and "incorrect orders." The tasks displayed in drop-down menu can be separate tasks that are involved with the "create sales order" process step corresponding to icon 304 or related tasks. In some examples, icons have drop-down menu indicators (not shown), that when selected, launch a drop-down menu. In other examples, selecting, right-clicking, or otherwise interacting with an icon launches a drop-down menu. Some process steps do not have associated tasks and will not launch drop-down menus. In drop-down menu 332, a counter displaying "5" is next to "work to be done." Much like the indicators associated with icons, this counter (or other type of indicator, such as an exclamation point, asterisk, or other symbol) indicates there are five sales orders to be created.

GUI 300 also includes tasks or items related to process map 302 but not a part of the process itself, including "customer accounts" icon 334, "products" icon 336, "price lists" icon 3338, "inspection plan" icon 340, "quality code catalog" icon 342, and "exchange rates" icon 344. Buttons 346, 348, 350, and 352 allow the user to select between different types of processes—overview, sales, purchasing, and financials, respectively. Process types are general process categories. As an example, for a "sales" process type, there are many different ways sales are performed, but more than one or all of these different sales processes can be included in a single process map for the sales process type. In some examples, related tasks are omitted.

In some examples, a process map is used as the default process navigation tool (e.g., is displayed when a process application is initiated or when a user logs in). In other examples, a menu (e.g., a menu on the left or right side of the screen) is provided as an alternate or supplemental navigation tool. In some examples, when a user logs in to an application, a most relevant (e.g., most frequently used, last used, most widely used for users of a same type/role, etc.) process map is displayed.

Figure 4:
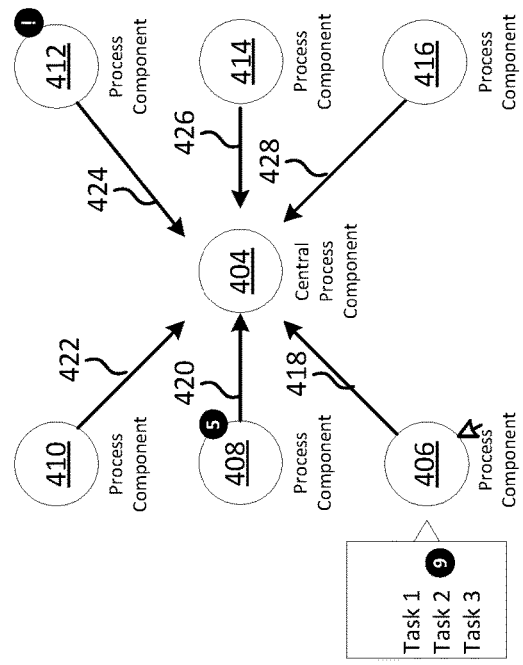
FIG. 4 illustrates an example graphical user interface showing a process map in which multiple process components relate to a central process component.

FIG. 4 illustrates a GUI 400 that includes a process map 402. In process map 402, an icon 404 corresponding to a central process component is connected to icons 406, 408, 410, 412, 414, and 416 via flow connectors 418, 420, 422, 424, 426, and 428. A process map such as process map 402 can be used in situations where the underlying process is less of a multi-step process where one step/component is performed before the next and more for situations where multiple inputs or process steps are performed but can be performed separately and independently of one another.

FIG. 5 illustrates an example system 500 configured to implement a process map navigation tool. System 500 includes a server 502 and a client device 504. Server 502 includes a database 506 (which can also be another type of data storage) that stores process maps 508. Processes can be analyzed and mapped and the resulting maps stored for later use. Mapping can be done by constructing a metamodel for the process and automatically or manually identifying the process, components/steps within the process, and tasks/activities assigned to each step. Such metamodels can be constructed in advance and can be extensible by users of a process application.

Process maps 508 are also stored in repository 510. An application is provided through backend 512 to client 504 via application logic 514 and repository 510. Process maps are generated through process map API 516 and JavaScript Object Notation (JSON) handler 518. In some examples, an Oberon frontend is implemented on client 504, and an Oberon backend is implemented as backend 512. Other scripting languages and implementation formats can also be used. System 500 can be used for a web application, for example. In other examples, an application and process maps are stored locally on client 504. In some examples, process maps are generated dynamically upon request through the application.

Figure 6:
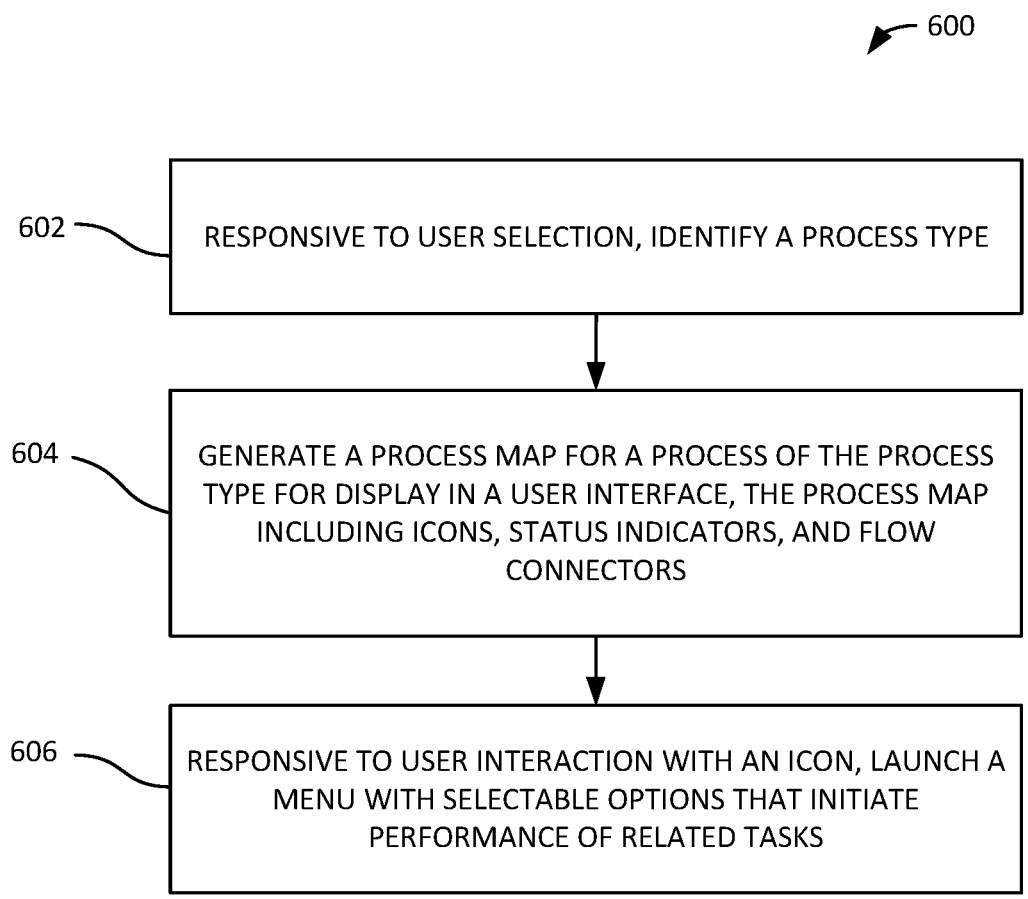
FIG. 6 illustrates an example method of navigating a process in a graphical user interface in which a menu is launched in response to interaction with an icon.

FIG. 6 illustrates a method 600 of navigating a process with a process map. In process block 602, responsive to a user selection, a process type is identified. The process type can be a default type or can be selected by a user from a menu, button, list, etc. Example process types include purchasing, sales, inventory, human resources, time administration, product data, product development, payables, tax management, project management, logistics, order fulfillment, field service and repair, and other processes. In process block 604, a process map for a process of the process type is generated for display in a graphical user interface.

The process map includes icons representing steps of the process as well as status indicators associated with one or more of the icons. The status indicators represent at least one of: a number of active instances of the corresponding step or a number of instances of the corresponding step awaiting action. The process map also includes flow connectors (such as an arrow or line) indicating an ordered relationship among the respective steps. In process block 606, responsive to a user interaction with one of the icons representing a step of the process, a menu is launched. The menu has a plurality of selectable options that initiate performance of respective tasks related to the process step.

Figure 7:
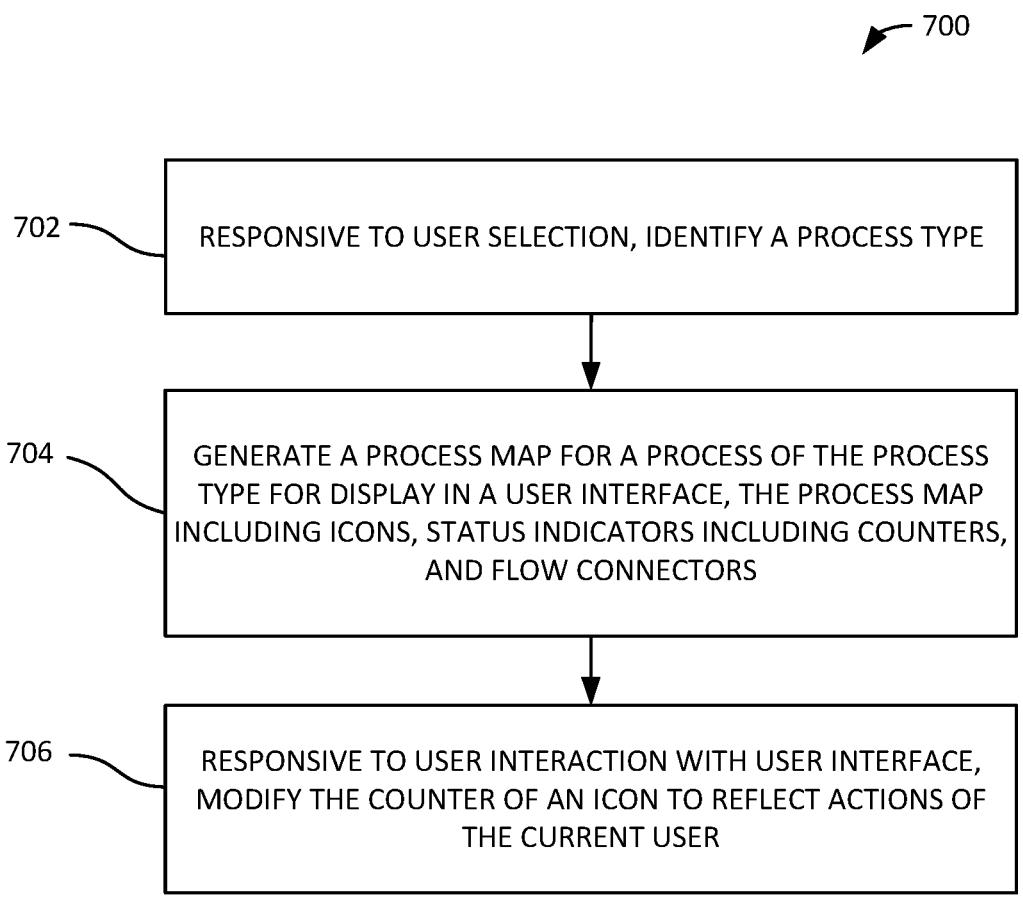
FIG. 7 illustrates an example method of navigating a process in a graphical user interface in which a counter of an icon indicator is modified to reflect actions by a current user.

FIG. 7 illustrates a method 700 of navigating a process with a process map. In process block 702, responsive to a user selection, a process type is selected from a group of available process types. A process map for a process of the process type is generated in process block 704 for display in a graphical user interface. The process map comprises a plurality of icons representing the respective steps of the process. For the respective icons, initiation of a task associated with the corresponding process step is performed through user interaction with the icon. The process map also includes status indicators associated with one or more of the icons. The status indicators include a counter representing at least one of: a number of active instances of the corresponding step or a number of instances of the corresponding step awaiting action. The process map also includes flow connectors indicating an ordered relationship among the respective steps. In process block 706, in response to a user interaction with the graphical user interface, the counter of at least one indicator is modified to reflect active instances of the corresponding step or instances of the corresponding step awaiting action for a current user.

Example Computing Systems

Figure 8:
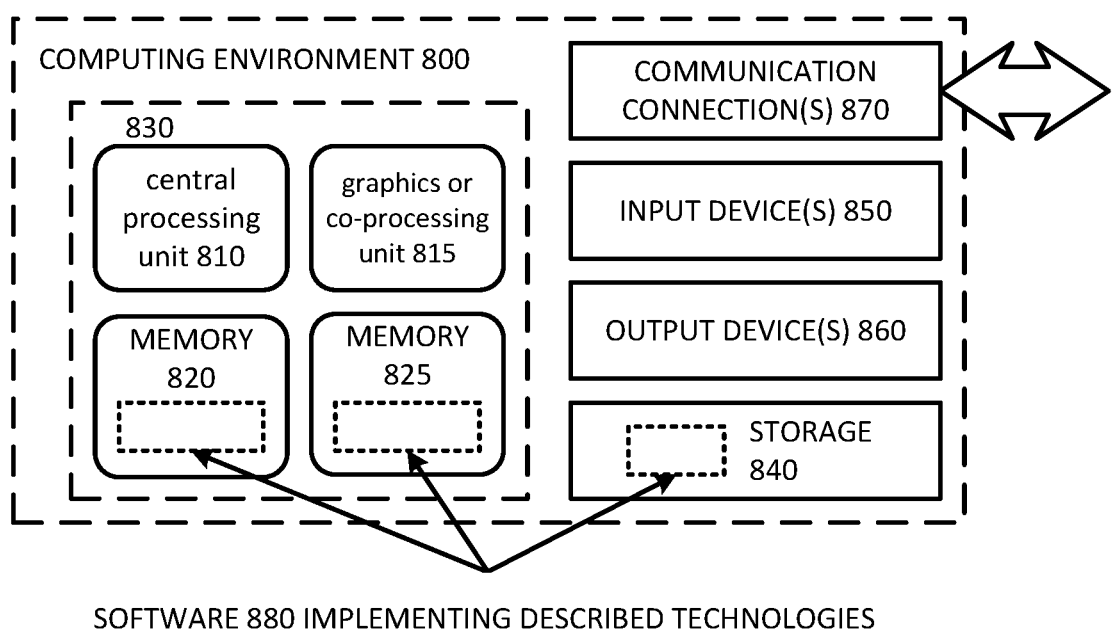
FIG. 8 is a diagram illustrating a generalized implementation environment in which some described examples can be implemented.

FIG. 8 depicts a generalized example of a suitable computing system 800 in which the described innovations may be implemented. The computing system 800 is not intended to suggest any limitation as to scope of use or functionality, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s). For example, memory 820 and 825 can store process maps 508 and process map API 516 of FIG. 5.

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information and which can be accessed within the computing system 800. The storage 840 stores instructions for the software 880 implementing one or more innovations described herein. For example, storage 840 can store process maps 508 and process map API 516 of FIG. 5.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 8, computer-readable storage media include memory 820 and 825, and storage 840. The term computer-readable storage media does not include signals and carrier waves. In addition, the term computer-readable storage media does not include communication connections (e.g., 870).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

We claim:

1. A method of navigating a process in a graphical user interface, comprising:

receiving a request to access the process;

determining a plurality of components of the process;

generating icons representing the respective components of the process, wherein for the respective icons, initiation of a task associated with the corresponding component of the process is performed through user interaction with the icon;

generating status indicators associated with one or more of the icons, the status indicators representing at least one of: a number of active instances of the corresponding process component, a number of instances of the corresponding process component awaiting action, or a degree of criticality of the process component, wherein at least one status indicator represents a process bottleneck at the corresponding process component;

establishing flow connectors between at least some of the icons indicating an ordered relationship among the respective process components, wherein the icons, status indicators, and flow connectors form a process map for the process in the graphical user interface; and generating icons for tasks or items related to the process but that are not part of the process, wherein the icons for the tasks or items are included in the graphical user interface with the process map.

2. The method of claim 1, further comprising responsive to a user interaction with one of the icons representing the respective components of the process, launching a menu having a plurality of selectable options for initiating performance of tasks related to the process component represented by the icon.

3. The method of claim 1, wherein the process map corresponds to a current user, and wherein the status indicators correspond to a workflow of the current user.

4. The method of claim 3, wherein the process map comprises one or more icons representing components of the process which the current user is not authorized to access.

5. The method of claim 1, wherein the process map corresponds to a group of users.

6. The method of claim 1, wherein the respective status indicators include a counter indicating either the number of active instances of the corresponding process component or the number of instances of the corresponding process component awaiting action.

7. The method of claim 1, wherein the icons and flow connectors of the process map form multiple pathways from a process beginning to a process end.

8. A system, comprising:

a processor; and one or more computer-readable storage media storing computer-readable instructions that, when executed by the processor, perform operations comprising:

responsive to a user selection, identifying a process type;

generating a process map for a process of the process type for display in a graphical user interface, wherein the process map comprises:

icons representing steps of the process;

status indicators associated with one or more of the icons, the status indicators representing at least one of: a number of active instances of the corresponding step or a number of instances of the corresponding step awaiting action;

a bottleneck warning indicator associated with an icon, the bottleneck warning indicator identifying the process step associated with the icon as a step delaying completion of the process, and flow connectors indicating an ordered relationship among the respective steps;

generating icons for tasks or items related to the process but that are not part of the process, wherein the icons for the tasks or items are included in the graphical user interface with the process map; and responsive to a user interaction with one of the icons representing a step of the process, launching a menu having a plurality of selectable options that initiate performance, in one or more applications, of respective tasks related to the process step.

9. The system of claim 8, wherein the menu includes a counter indicating at least one of: a number of active instances of a task related to the process step or a number of instances of a task related to the process step awaiting action.

10. The system of claim 8, wherein the status indicators correspond to a current user.

11. The system of claim 10, wherein the operations further comprise updating the status indicators based on activity of the current user.

12. The system of claim 8, wherein the status indicators correspond to members of an organization.

13. The system of claim 12, wherein the operations further comprise updating the status indicators based on activity of one or more of the members of the organization.

14. The system of claim 8, wherein the respective status indicators include a counter indicating either the number of active instances of the corresponding process step or the number of instances of the corresponding process step awaiting action.

15. One or more computer-readable storage media storing computer-executable instructions for navigating a process in a graphical user interface, the navigating comprising:

responsive to a user selection, selecting a process type from a group of available process types;

generating, for display in the graphical user interface, a process map for a process of the process type, wherein the process map comprises:

a plurality of icons representing the respective steps of the process, wherein for the respective icons, initiation of a task associated with the corresponding process step is performed through user interaction with the icon;

status indicators associated with one or more of the icons, the status indicators including a counter representing at least one of: a number of active instances of the corresponding step or a number of instances of the corresponding step awaiting action;

a bottleneck warning indicator associated with an icon, the bottleneck warning indicator identifying the process step associated with the icon as a step delaying completion of the process, and flow connectors indicating an ordered relationship among the respective steps;

generating icons for tasks or items related to the process but that are not part of the process, wherein the icons for the tasks or items are included in the graphical user interface with the process map; and in response to a user interaction with the graphical user, modifying the counter of at least one indicator to reflect active instances of the corresponding step or instances of the corresponding step awaiting action for a current user.

16. The one or more computer-readable storage media of claim 15, wherein navigating further comprises:

responsive to a user interaction with one of the icons representing a step of the process, launching a menu having a plurality of selectable options that initiate performance of tasks related to the process step.

* * * * *